Dec. 5, 1933.　　　J. H. WAGENHORST　　　1,938,235
VEHICLE WHEEL
Original Filed July 17, 1924　　2 Sheets-Sheet 1

INVENTOR.
J.H.Wagenhorst
BY Church & Church
his ATTORNEYS

Dec. 5, 1933.  J. H. WAGENHORST  1,938,235
VEHICLE WHEEL
Original Filed July 17, 1924   2 Sheets-Sheet 2

INVENTOR.
J.H. Wagenhorst
BY Church & Church
his ATTORNEYS

Patented Dec. 5, 1933

1,938,235

UNITED STATES PATENT OFFICE 1,938,235

VEHICLE WHEEL

James H. Wagenhorst, Jackson, Mich.

Original application July 17, 1924, Serial No. 726,529. Divided and this application April 2, 1927. Serial No. 180,477

5 Claims. (Cl. 301—6)

My present invention relates to vehicle wheels, and has to do more particularly with the construction of wheels intended for use upon automobiles and for carrying a resilient tire, preferably of the pneumatic type. This application is a division of my co-pending application for Letters Patent for Improvements in vehicle wheels, Serial No. 726,529, filed July 17th, 1924.

The widespread use of balloon tires, or tires of larger cross-section than those heretofore used on automobiles of corresponding size and weight, has resulted in a considerable decrease in the diameter and an increase in the width of the demountable rims. The result of this change is that the rims now used for tires of the balloon type, are considerably stiffer and stronger than the rims heretofore used, for automobiles of corresponding size and weight. Coincident with the widespread adoption of balloon tires has been the use on many automobiles of four-wheel braking systems, necessitating the mounting of brakedrums on front, as well as rear, hubs. These changes have resulted in a marked increase in the unsprung weight on the front axle, which increase has been so noticeable, in some cases, as to require the re-design of the axle to strengthen it.

In connection with these changes, the old practice has heretofore been followed, however, in the design and manufacture of the wheels, and the wheels are heavier and more expensive than they need to be, and contribute unnecessarily to the unsprung weight on the front axle. The main object of my present invention is to provide an improved wheel construction, in which the weight of the wheel shall be kept as low as possible, and the total cost of the wheel, including the brakedrum, reduced considerably, without weakening it, so that it will not adequately withstand the forces, such as load, sidethrust, and torque, imposed upon the structure. With that end in view, I propose to provide a construction in which the brakedrum constitutes the body of the wheel, and the tire-carrying rim is detachably connected to the brakedrum by means of relatively short spoke members, or lugs, rigidly secured to the rim and detachably connected to the brakedrum.

It is an object of my invention to provide a brakedrum having stiffening formations, which strengthen and reinforce it against the stresses, such as load, sidethrust, and torque, which are, in my wheel construction, transmitted through the brakedrum. It is a further object of my invention to provide a construction in which these stiffening formations coact with the spoke members, or lugs, secured to the rim, to form an interlocking connection through which the forces are transmitted from the drum to the rim, or vice versa.

It is a further object of my invention to provide a wheel construction having relatively short spoke members rigidly secured to the rim and detachably connected to the brakedrum, of such construction that they can be manufactured very cheaply, add little to the weight, may be cheaply and quickly secured to the rim, and yet have ample strength to withstand the stresses exerted upon them, and to transmit such stresses from rim to brakedrum, or vice versa.

Further objects, and objects relating to details and economies of construction and operation, will definitely appear from the detailed description to follow. In one instance, I accomplish the objects of my invention by the devices and means set forth in the following specification. My invention is clearly defined and pointed out in the appended claims. A structure constituting a preferred embodiment of my invention is illustrated in the accompanying drawings, forming a part of this specification, in which Figure 1 is a view, in side elevation, of a wheel embodying my invention;

In the drawings, the same reference numerals refer to the same parts, throughout the several views.

Referring to the numbered parts of the drawings, in which a preferred embodiment of my invention is illustrated, I have shown a brakedrum 10, connected to a hub in any suitable manner. This brakedrum has formed in its side wall a plurality of radial corrugations 47, extending from near the center of the brakedrum to adjacent its periphery. These radial corrugations serve to strengthen and reinforce the drum, to enable it to withstand the forces, such as load, sidethrust, and torque, imposed on it and transmitted through it, in this wheel construction.

Figure 1:
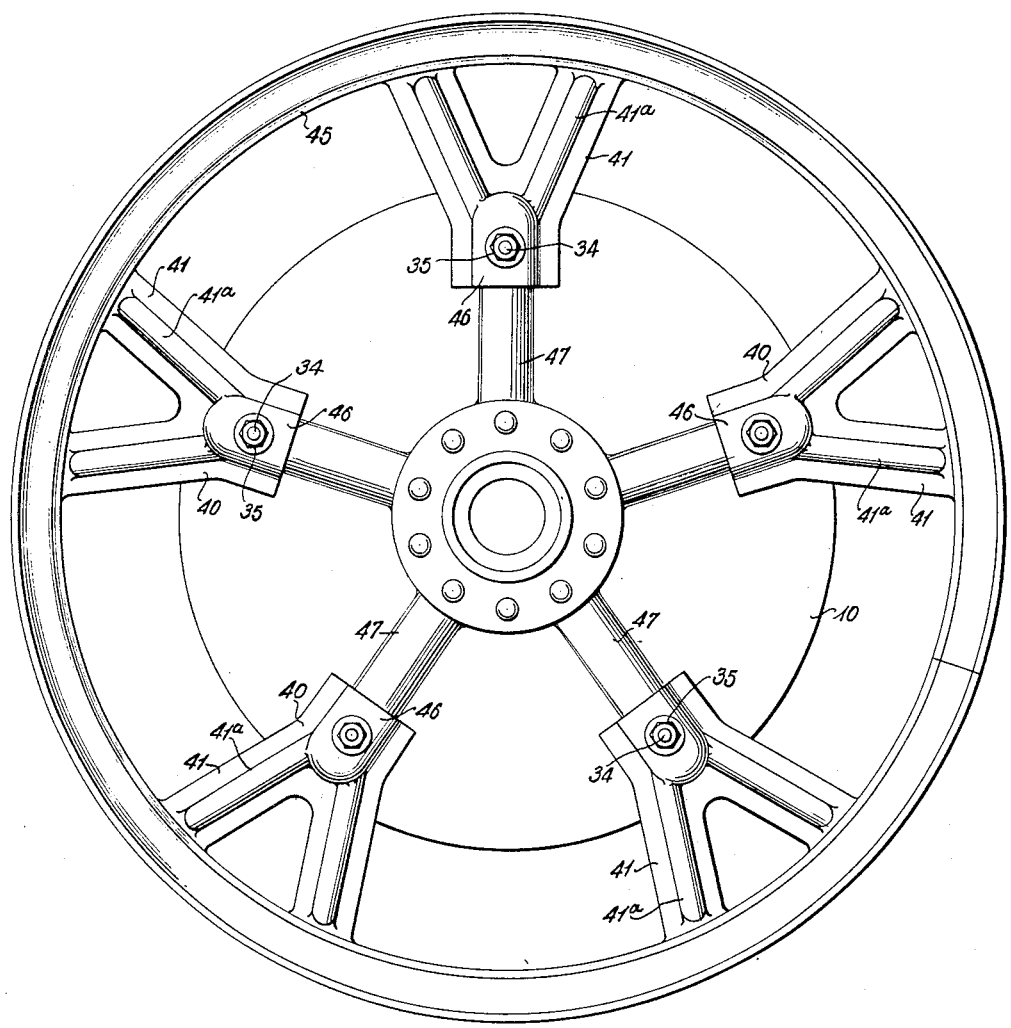
Figure 5:
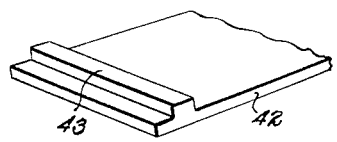
Fig. 5 is a fragmentary, detail view showing the outer end of the spoke member, prior to its application and attachment to the rim.
Figure 2:
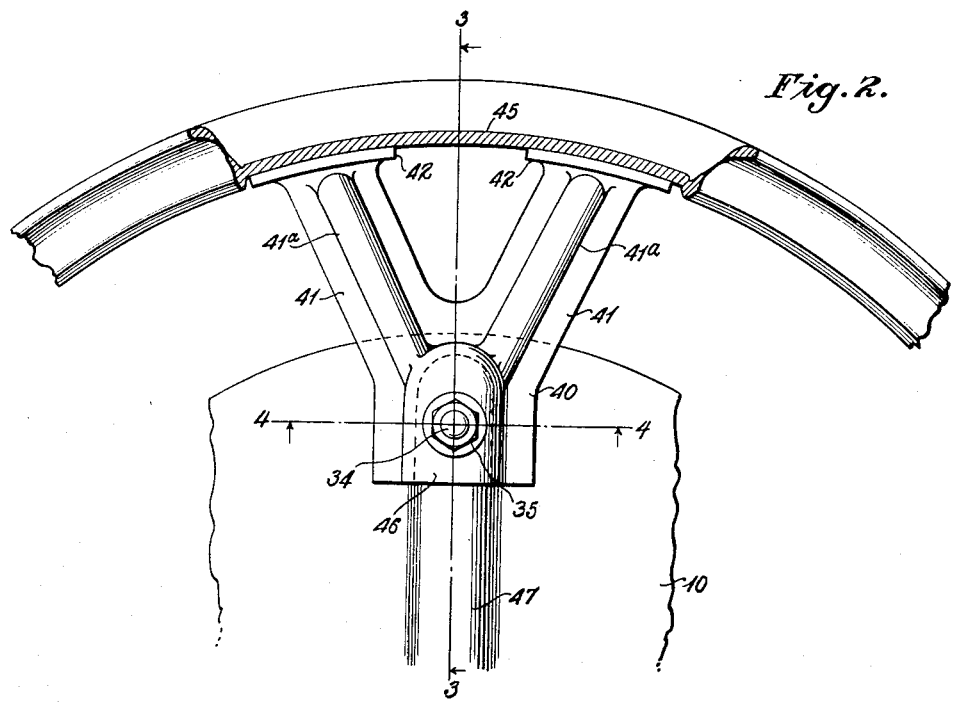
Fig. 2 is a fragmentary view, partly in side elevation and partly in section, illustrating a single spoke member and its connection with the brakedrum, in detail.
Figure 3:
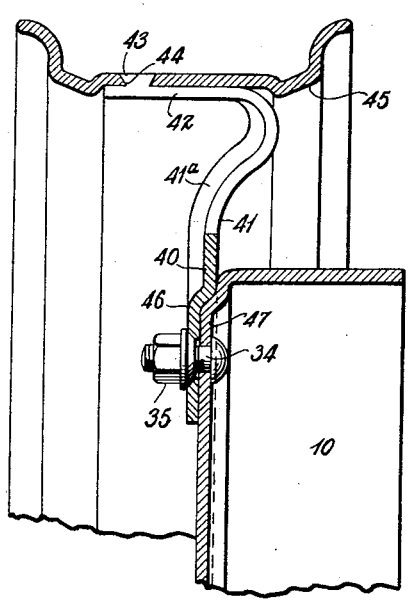
Fig. 3 is a vertical sectional view taken on the line 3—3 of Fig. 2.
Figure 4:
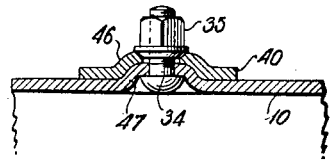
Fig. 4 is a detail sectional view taken on the line 4—4 of Fig. 2.

The tire-carrying rim is adapted to receive a pneumatic tire, and provided with side flanges of usual construction, which may be, as shown, of the straight side type, or, if desired, of the clincher type. Of course, the rim might be of the Q. D. type, in case that were deemed desirable. In the rim illustrated, inwardly projecting beads 45 are rolled in the rim base, near the side flanges, thus providing an inwardly-facing channel between these beads, which receives the outer portions 42 of the spoke members. Each spoke member 40 includes an inner portion, which lies alongside of the side wall of the brakedrum and is provided with a corrugation 46, adapted to seat on and interlock with the outer portion of one of the radial corrugations 47 and, in the wheel construction shown, a pair of diverging outer legs, or portions, 41, which are curved rearwardly and then bent forwardly to provide the portions 42, extending parallel to and in engagement with the inner face of the rim and disposed in the channel heretofore referred to. To stiffen the spoke members, corrugations 41a may be provided in the portions 41, said corrugations being shown as communicating with the corrugation 46, and extending to points near the beginning of the portions 42. The spoke members are rigidly secured to the rim base by means of the riveting studs or lugs 43, on the portions 42, which extend through holes 44 in the base of the rim, and are upset or riveted over, as shown in Fig. 3.

The inner end portions of the spoke members seat upon the outer ends of the radial corrugations 47, in the brakedrum, and are interlocked therein. The spoke members are detachably connected to the brakedrum by means of the bolts 34, extending laterally through holes in the corrugations of the brakedrum, and adapted to pass through bolt holes formed in the corrugations 46 of the respective spoke members. Nuts 35, screwed on the ends of these bolts, engage the inner portions of the spoke members and clamp them against the brakedrum, with the corrugation 46 of each spoke member engaging and interlocking with the outer portion of a corrugation 47 of the brakedrum. The nuts 35 may be provided with conical or convex faces, which engage countersunk portions of the bolt holes in the spoke members, forming concave recesses to receive the corresponding faces of the nuts 35.

It will be observed that the tire carrying rim is detachably connected to the brakedrum, so that the rim and the tire carried thereby may be removed quickly and easily, if a tire change becomes necessary. The tire carrying rim may be a split rim, and the spoke members or lugs attached to the rim are of such character that they will not interfere with the collapsing of that rim, in case the tire has to be removed therefrom. The brakedrum is stiffened by the corrugations so as to withstand the stresses, such as load, sidethrust, and torque, which, in this construction, are imposed upon it and transmitted through it, and these stiffening corrugations, interlocking with corresponding formations in the spoke members, provide a strong and effective connection between such parts.

It will be observed that, in this wheel of my invention, the only weight in addition to that of the brakedrum and rim, is the weight of the relatively small and short spoke members attached to the rim, and the nuts and bolts by which these spokes are detachably connected to the brakedrum. The weight of these parts is much less than the weight of the usual spoke and felly constructions, used heretofore with the brakedrum, in wheels in which the load, sidethrust, and torque are transmitted from rim to hub, or vice versa, through the felly and spoke constructions, instead of being transmitted directly through the brakedrum, as in my improved wheel.

I am aware that this construction may be varied considerably without departing from the spirit of my invention, and, therefore, I claim my invention broadly, as set forth in the appended claims.

What I claim is:

1. A wheel comprising a brakedrum, a tire-carrying rim, and means for demountably attaching said rim to the drum and transmitting load, sidethrust, and torque from one to the other, including a plurality of spoke members rigidly secured to the rim and detachably connected to the brakedrum, said brakedrum having stiffening formations therein to strengthen it against the load, sidethrust, and torque imposed thereon, and said spoke members seating on and interlocking with said stiffening formations.

2. A wheel comprising a brakedrum, a tire-carrying rim, and means for demountably attaching said rim to the drum and transmitting load, sidethrust, and torque from one to the other, including a plurality of spoke members rigidly secured to the rim and detachably connected to the brakedrum, said brakedrum having radial corrugations formed therein to reinforce it against the load, sidethrust, and torque imposed thereon, and said spoke members engaging and interlocking with said radial corrugations.

3. A wheel comprising a brakedrum having radial corrugations formed in the side wall thereof and extending to points near its outer periphery, a tire-carrying rim, a plurality of spoke members rigidly secured to said rim with their inner portions seating on and interlocking with the outer portions of said corrugations, and means for detachably connecting said spoke members to said drum, whereby the load, sidethrust, and torque are transmitted through the brakedrum.

4. A wheel comprising a brakedrum having radial corrugations formed in the side wall thereof and extending to points near its outer periphery, a tire-carrying rim, a plurality of spoke members rigidly secured to said rim with their inner portions seating on and interlocking with the outer portions of said corrugations, bolts extending through said corrugations and spoke members, and nuts screwed on said bolts and clamping the spoke members against the brakedrum, whereby the load, sidethrust, and torque are transmitted through the brakedrum.

5. A wheel comprising a brakedrum having a plurality of radial corrugations therein, a tire-carrying rim, a plurality of spoke members each comprising an outer portion bent laterally, extending parallel to and rigidly secured in engagement with the inner face of the rim, and an inner portion extending alongside the side wall of the brakedrum and having a longitudinal corrugation fitting and interlocking with a radial corrugation of the brakedrum, and means for detachably connecting the inner portions of said spoke members to the brakedrum, whereby load, sidethrust, and torque are transmitted through the brakedrum.

JAMES H. WAGENHORST.